United States Patent
Gao et al.

(10) Patent No.: US 11,557,068 B2
(45) Date of Patent: Jan. 17, 2023

(54) CONSTRAINED RECONSTRUCTION MODEL TO RESTORE MISSING WEDGE FROM MULTIPLE OBSERVATIONS WITH LIMITED RANGE PROJECTIONS

(71) Applicant: KING ABDULLAH UNIVERSITY OF SCIENCE AND TECHNOLOGY, Thuwal (SA)

(72) Inventors: Xin Gao, Thuwal (SA); Renmin Han, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 83 days.

(21) Appl. No.: 16/982,419

(22) PCT Filed: Mar. 19, 2019

(86) PCT No.: PCT/IB2019/052238
§ 371 (c)(1),
(2) Date: Sep. 18, 2020

(87) PCT Pub. No.: WO2019/193441
PCT Pub. Date: Oct. 10, 2019

(65) Prior Publication Data
US 2021/0082162 A1    Mar. 18, 2021

Related U.S. Application Data

(60) Provisional application No. 62/651,382, filed on Apr. 2, 2018.

(51) Int. Cl.
*G06T 11/00*    (2006.01)
*G06F 17/12*    (2006.01)

(52) U.S. Cl.
CPC ............ *G06T 11/006* (2013.01); *G06F 17/12* (2013.01); *G06T 2211/424* (2013.01); *G06T 2211/436* (2013.01)

(58) Field of Classification Search
CPC ................. G06T 11/006; G06T 11/003; G06T 2211/424; G06T 2211/436; G06F 17/12
See application file for complete search history.

(56) References Cited

U.S. PATENT DOCUMENTS 7,872,235 B2 * 1/2011 Rousso ................. G01T 1/1647
250/363.04
8,615,118 B2 * 12/2013 Yi ........................... A61B 6/032
382/128

(Continued)

FOREIGN PATENT DOCUMENTS

DE    102012200920 A1 * 7/2013 ........... A61B 6/5205
WO    WO-2009129137 A1 * 10/2009 ......... G01R 33/4818

OTHER PUBLICATIONS

Kak, Avinash, Principles of Computerized Tomographic Imaging; Ch 7 Algebraic Reconstruction Algorithms, Society for Industrial and Applied Mathematics, SIAM edition, pp. 275-296. (Year: 2001).*

(Continued)

*Primary Examiner* — Matthew C Bella
*Assistant Examiner* — Kathleen M Broughton
(74) *Attorney, Agent, or Firm* — Patent Portfolio Builders PLLC

(57) ABSTRACT

A method for image reconstruction from plural copies, the method including receiving a series of measured projections $p_i$ of a target object h and associated background; iteratively reconstructing images $h_i(k)$ of the target object and images $g_i(k)$ of the background of the target object for each member i of the series of the measured projections $p_i$ over plural iterations k; and generating a final image of the target object (Continued)

h, based on the reconstructed images $h_i$, when a set condition is met. The index i describes how many elements are in the series of projections $p_i$, and iteration k indicates how many times the reconstruction of the image target is performed.

17 Claims, 9 Drawing Sheets

(56) References Cited

U.S. PATENT DOCUMENTS

| | | | | |
|---|---|---|---|---|
| 2008/0199063 | A1* | 8/2008 | O'Halloran | G01R 33/56341 382/131 |
| 2013/0004052 | A1* | 1/2013 | Chen | G06T 7/251 382/132 |
| 2014/0369581 | A1* | 12/2014 | Fu | G06T 11/006 382/131 |
| 2015/0347682 | A1* | 12/2015 | Chen | G16H 80/00 705/2 |
| 2019/0340306 | A1* | 11/2019 | Harrison | G06T 15/506 |

OTHER PUBLICATIONS

Kak et al, Principles of Computerized Tomographic Imaging (2001), Algebraic Reconstruction Algorithms IEEE Press, pp. 275-295. (Year: 2001).*

A. H. Anderson et al., "Simultaneous Algebraic Reconstruction Technique (SART): A Superior Implementation of the Art Algorithm," Ultrasonic Imaging 6, Jan. 1984, pp. 81-94, W. Lafayette, India.

C.O.S. Sorzano et al., "A Survey of the Use of Iterative Reconstruction Algorithms in Electron Microscopy," BioMed Research International, Sep. 17, 2017, vol. 2017, pp. 1-17.

D. J. De Rosier et al., "Reconstruction of Three Dimensional Structures From Electron Micrographs," Nature Publishing Group, Jan. 13, 1968, vol. 217, pp. 130-134.

Frank Natterer, "The Mathematics of Computerized Tomography," Universität Münster, Jul. 1985, pp. 1-222, Münster, Germany.

Isaac Fried, "Condition of Finite Element Matrices Generated from Nonuniform Meshes," Boston University, Feb. 1972, pp. 219-221, Boston Massachusetts, United States.

Jose Maria Carazo, "The fidelity of 3d reconstructions from incomplete data and the use of restoration methods," In Electron tomography, 1992, pp. 117-164.

Jose Marie Carazo et al., "Information recovery in missing angular data cases: an approach by the convex projections method in three dimensions," Journal of Microscopy, Aug. 28, 1986, vol. 145, PT. 1, pp. 23-43, Madrid, Spain.

Kenji Shimizu et al., "Rapid Tip Tracking with MRI by a Limited Projection Reconstruction Technique," Journal of Magnetic Resonance Imaging, Oct. 15, 1997, vol. 8, No. 1, pp. 262-264.

L. A. Shepp et al., "The Fourier Reconstruction of A Head Section," IEEE Transactions on Nuclear Science, Jun. 1974, vol. NS-21, pp. 21-43, Murray Hill, New Jersey, United States.

Lubomír Kováčik et al., "A Simple Fourier Filter for Suppression of the Missing Wedge Ray Artefacts in Aingle-Axis electron tomographic reconstructions," Journal of Structural Biology, Feb. 11, 2014, pp. 141-152.

Ming Jiang et al., "Convergence of the Simultaneous Algebraic Reconstruction Technique (SART)" IEEE Transactions on Image Processing, Aug. 2003, vol. 12, No. 8, pp. 957-961.

Nathan James et al., "Translational Termination Without a Stop Codon," Structural Biology, Dec. 16, 2016, vol. 354, Issue. 6318, pp. 1437-1441.

Ning Zhu et al., "Ultrasonic Computerized Tomography (CT) for Temperature Measurements with Limited Projection Data Based on Extrapolated Filtered Back Projection (FBP) Method," Energy, Jul. 2004, pp. 509-522.

Pawel A. Penczek et al., "Gridding-Based Direct Fourier Inversion of the Three-Dimensional Ray Transform," Optical Society of America, Apr. 2004, vol. 21, No. 4.

Peter Gilbert, "Iterative Methods for the Three-Dimensional Reconstruction of an Object from Projections," Medical Research Council's Laboratory of Molecular Biology, Sep. 1, 1971, pp. 105-117, Hills Road, Cambridge, England.

Renmin Han et al., "AuTom: A Novel Automatic Platform for Electron Tomography Reconstruction," Journal of Structural Biology, Jul. 2017, pp. 196-208.

Richard Gordon et al., "Algebraic Reconstruction Techniques (ART) for Three-Dimensional Electron Microscopy and X-ray Photography," Journal Theory Biology, Aug. 12, 1970, pp. 471-181, Buffalo, New York, United States.

Rowan Leary et al., "Compressed Sensing Electron Tomography," Ultramicroscopy, Mar. 22, 2013, pp. 70-91.

Sjors H.S. Scheres, "Relion: Implementation of a Bayesian Approach to Cryo-EM Structure Determination," Journal of Structural Biology, Sep. 6, 2012, pp. 519-530.

Tao Wu et al., "Tomographic Mammography Using a Limited Number of Low-Dose Cone-Beam Projection Images," Medical Physics, Feb. 6, 2003, vol. 30, pp. 365-380, American Association of Physicists in Medicine.

Wendy Harris et al., "Estimating 4D CBCT From Prior Information and Extremely Limited Angle Projections Using Structural PCA and Weighted Free-Form Deformation for Lung Radiotherapy," HHS Public Access, Mar. 1, 2018, pp. 1089-1104, Durham, North Carolina, United States.

Wim Van Aarle et al., "Automatic Parameter Estimation for the Discrete Algebraic Reconstruction Technique (DART)," IEEE Transactions on Image Processing, vol. 21, No. 11, Nov. 2012, pp. 4608-4621.

Yu Chen et al., "Firt: Filtered Iterative Reconstruction Technique With Information Restoration," Journal of Structural Biology, Apr. 28, 2016, pp. 49-61.

Yuchen Deng et al., "Icon: 3D Reconstruction With Missing-Information Restoration In Biological Electron Tomography," Journal of Structural Biology, Apr. 11, 2016, pp. 100-112.

Yuxiang Chen et al., "Iterative Reconstruction of Cryo-Electron Tomograms Using Nonuniform Fast Fourier Transforms," Journal of Structural Biology, Dec. 4, 2013, pp. 309-316.

International Search Report in corresponding/related International Application No. PCT/IB2019/052238, dated Jun. 27, 2019.

Written Opinion of the International Searching Authority in corresponding/related International Application No. PCT/IB2019/052238, dated Jun. 27, 2019.

* cited by examiner

Algorithm 1 Sparse Kaczmarz for costrained reconstruction

Require: measured $b_i$, $i = 1, ..., N$, $\varepsilon_0$
Ensure: $h$
  iteration number $k \leftarrow 1$, particle index $i \leftarrow 1$
  $h^{(k=1, i=1)} \leftarrow 0, g_1^{k=1} \leftarrow 0, g_2^{k=1} \leftarrow 0, ..., g_N^{k=1} \leftarrow 0$
  $h_{old} \leftarrow 0$
  while $k \leq MAX\_ITR$ do
    for $i \leq N$ do
      $h^{(k,i)} \leftarrow h_{old}$
      update $h^{(k,i)}$, $g_i^k$ by $D_i h + B_i g_i = b_i$ with Kaczmarz
      $h_{old} \leftarrow h^{(k,i)}$, $i \leftarrow i + 1$
    end for
    $k \leftarrow k + 1$
  end while
  return $h \leftarrow h_{old}$

FIG. 2

| Datasets | Shepp and Logan phantom | | | Structural of Ribosome | | |
| --- | --- | --- | --- | --- | --- | --- |
| | PSNR | SSIM | PCC | PSNR | SSIM | PCC |
| AVG | 19.7162 | 0.74426 | 0.9324 | 29.0563 | 0.81022 | 0.64988 |
| CRM | 23.4059 | 0.78748 | 0.98283 | 30.0187 | 0.87377 | 0.7288 |

FIG. 7

CONSTRAINED RECONSTRUCTION MODEL TO RESTORE MISSING WEDGE FROM MULTIPLE OBSERVATIONS WITH LIMITED RANGE PROJECTIONS

CROSS-REFERENCE TO RELATED APPLICATIONS

This application is a U.S. National Stage Application of International Application No. PCT/IB2019/052238, filed on Mar. 19, 2019, which claims priority to U.S. Provisional Patent Application No. 62/651,382, filed on Apr. 2, 2018, entitled "CRM: A CONSTRAINED RECONSTRUCTION MODEL TO RESTORE MISSING WEDGE FROM MULTIPLE OBSERVATIONS WITH LIMITED RANGE PROJECTIONS," the disclosures of which are incorporated herein by reference in their entirety.

BACKGROUND

Technical Field

Embodiments of the subject matter disclosed herein generally relate to image reconstruction from plural projections obtained from an imagining device, and more specifically, to recovering information from various observations associated with an object that was imagined with the imagining device, where the observations have a limited range and stained projections.

Discussion of the Background

Various imagining devices are used today for investigating the subatomic world, be it in biology, medical science, microelectronics, etc. Some of the most used imagining devices are the Computed Tomography (CT), Magnetic resonance imaging (MRI) and Electron Tomography (ET). Many other devices exist that offer a glimpse into the subatomic worlds. However, the images generated by such devices suffer from the same problems as now discussed. All these devices are designed to take a set of images (sometime called projections) of a same object, but from various angles. The goal is then to assemble together these projections and generate a three-dimensional image of the imaged object. For image reconstruction from plural projections, one of the challenges is to solve the target object from stained environments and limited range projections. For example, the electron tomography always has the projections (tilt series) limited within ±40° to ±70°, which causes the missing wedge effect and degenerates the reconstruction quality. Consequently, to discover the target object or ultrastructure, researchers try to collect a set of copies associated with the target object and then the traditional software averages these copies to compensate the missed information.

Very similar conditions happen in different fields, i.e., the interest is in a target object but what the imaging devices collect is a large number of stained observations with limited tilt range. Currently, these observations from different copies are processed separately and then merged together by averaging, which is called in the art the "averaging workflow." Nevertheless, the usage of the collected information by these algorithms is quite insufficient in the averaging workflow.

Thus, there is a need for a new computational workflow that is capable to recover the information associated with a target object from various observations with limited range and stained projections so that the missing wedge is recovered without any further prior assumption.

SUMMARY

According to an embodiment, there is a method for image reconstruction from plural copies, the method including receiving a series of measured projections $p_i$ of a target object h and associated background; iteratively reconstructing images $h_i(k)$ of the target object and images $g_i(k)$ of the background of the target object for each member i of the series of the measured projections $p_i$ over plural iterations k; and generating a final image of the target object h, based on the reconstructed images $h_i$, when a set condition is met. The index i describes how many elements are in the series of projections $p_i$, and iteration k indicates how many times the reconstruction of the image target is performed.

According to another embodiment, there is a computing device for reconstructing an image from plural copies, the computing device including an interface for receiving a series of measured projections $p_i$ of a target object h and associated background; and a processor connected to the interface and configured to, iteratively reconstruct images $h_i(k)$ of the target object h and images $g_i(k)$ of the background of the target object for each member i of the series of the measured projections $p_i$ for plural iterations k; and generate a final image of the target object h, based on the reconstructed images $h_i$, when a set condition is met. The index i describes how many elements are in the series of projections $p_i$, and the iteration k indicates how many times the reconstruction of the image target is performed.

According to still another embodiment, there is a non-transitory computer readable medium including computer executable instructions, wherein the instructions, when executed by a processor, implement instructions for image reconstruction from plural copies as discussed above.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 schematically illustrates a sparse Kaczmarz algorithm used for the constrained reconstruction workflow;

FIG. 7 shows results obtained with the averaging workflow and the constrained reconstruction workflow;

DETAILED DESCRIPTION

Figure 1:
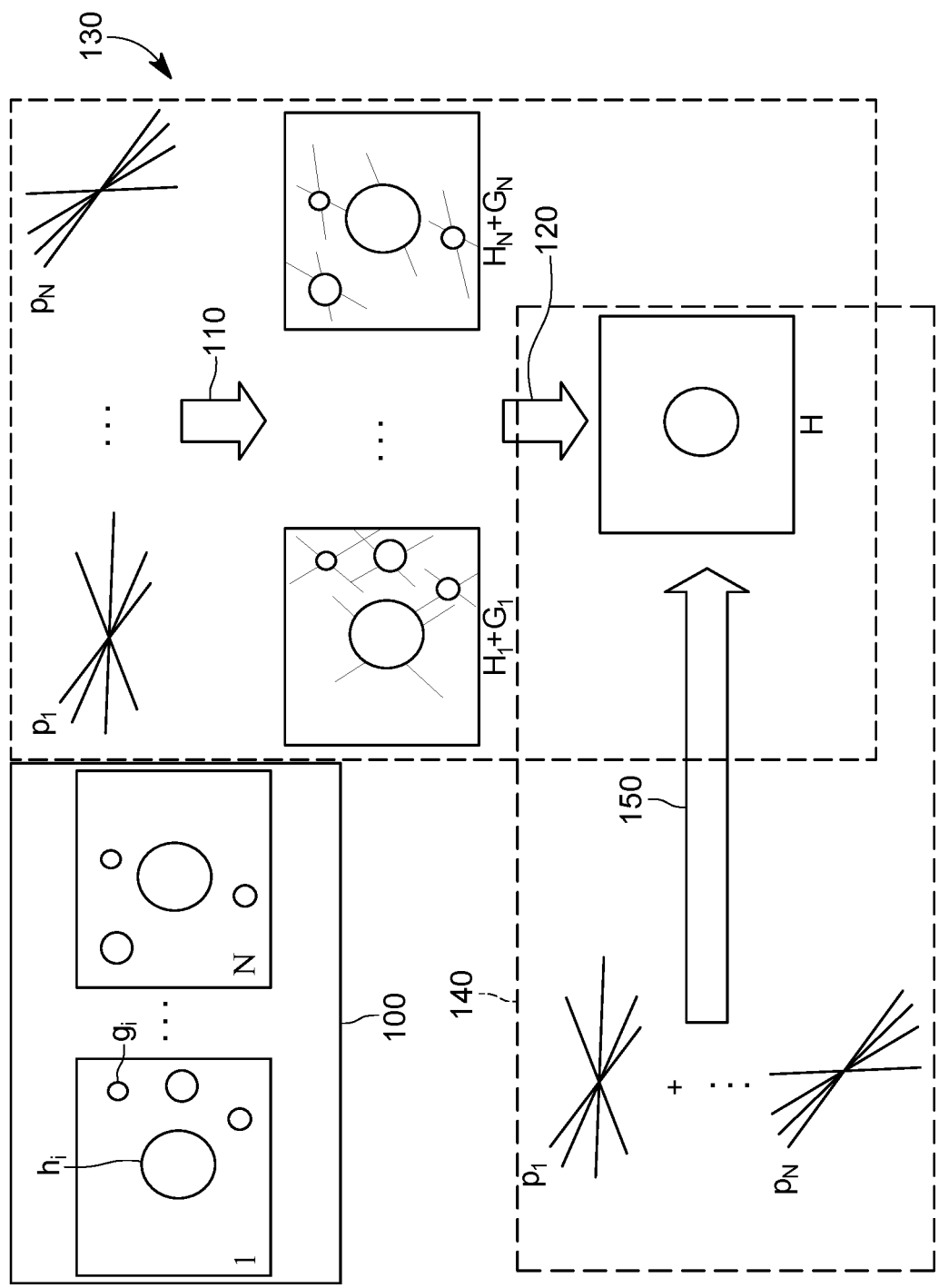
FIG. 1 is a schematic illustration of an averaging workflow and a constrained reconstruction workflow.

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a novel computational model (or workflow), the constrained reconstruction model (CRM), which is capable of recovering the information associated with the target object from various observations with limited range and stained projections. The proposed computational model is able to fully use the rendering information in each copy's projections and making a precise estimation of the object. The proposed model recovers the missing wedge without any prior assumption. This method facilitates an improved reconstruction workflow from a set of limited range projections and promises a possible higher resolution in applications like subtomogram averaging.

Prior to discussing the novel concepts of this new workflow, a short review of the existing image reconstruction methods is believed to be in order. Radon transform and the projection-slice theorem are the basic ingredients for image reconstruction from projections. Those skilled in the art would understand that other mathematical tools may be used for image reconstruction from projections. A perfect reconstruction of the image requires a full coverage of the tilt angles. However, in practice, the goal is to resolve the information associated with the target object from stained environments and limited range projections. One of the classic range-limited problem is the electron tomography.

Limited tilt range will cause the missing wedge effect and result in artifacts. Therefore, the limited range projection problem is a hot topic in the field of computer tomography, radial physics, ultrasonic and medicine imaging. In electron tomography, efforts also have been done to compensate or suppress the effect of missing wedge (Carazo and Carrascosa, 1987; Carazo, 1992; Leary et al., 2013; Kovacik et al., 2014; Chen and Forster, 2014; Chen et al., 2016; Deng et al., 2016). These works try to introduce additional constraints representing a priori knowledge about the target object, in an effort to narrow down the solution space. However, the missing information is not there and thus, the a priori knowledge is usually used to reduce artifacts instead of recovering the truthful missed signals.

To reduce the noise and suppress the artifacts, a simplified way is to "average" hundreds of thousands of observations' results (here, an observation refers to the set of projections from a copy of the target object). Such technique is called subtomogram averaging in ET, which is one of the most used technique in structural biology. In subtomogram averaging, the whole volume of the target object and its surroundings will be firstly reconstructed from a series of projections, and then the interested ultrastructures (subvolume) are (1) picked from the reconstructed 3D volumes, (2) aligned and (3) averaged to strengthen the useful signal. Under this condition, the information of the target object is retained by averaging all the final results. Another similar but more sophisticated technique is the single particle analysis, where the projections of purified macromolecules are obtained from fast-frozen volumes with clean ice surrounding. The picked and classified 2D projections of the macromolecules can be aligned and averaged in the 3D space to reinforce the molecular signal during whole-scale optimization.

One of the difficulty common for all these methods is that not all the applications generate projections that have clean surroundings. Usually, the observations are stained by the surrounding background and noise. For example, the copies of the macromolecules in subtomogram averaging are usually embedded in the cellular environment, which result in stained observations. Though the projection space has been fully covered by these observations, an overall full angular reconstruction is still impossible because of the various backgrounds. Therefore, these methods still suffer from the missing wedge problem due to the separate reconstruction of each observation, though all the necessary information is available.

In this embodiment, a constrained reconstruction model is used to restore the missing wedge from the various observations. The embodiment uses a clear definition of the constrained reconstruction method and shows better results relative to the conventional averaging workflow.

The reconstruction algorithms can be categorized into direct Fourier inversion, iterative algorithms, and backprojection methods. This embodiment uses the algebraic reconstruction technique (ART) (Gordon et al., 1970), which is a class of well-proved iterative algorithms. The conclusion deduced from algebraic reconstruction can be easily generalized to other iterative algorithms.

The Kaczmarz method or Kaczmarz's algorithm is an iterative algorithm for solving linear equation systems and is applicable to any linear system of equations. A brief introduction to the Kaczmarz algorithm is now presented.

Let Ax=b be a linear system and let m be the number of rows of A, $A_i$ be the i-th row of valued matrix A, and let $x^0$ be an arbitrary initial approximation to the solution of Ax=b. For k=0, 1, . . . compute $$x^{k+1} = x^k + \lambda_k \frac{b_i - \langle A_i, x^k \rangle}{\|A_i\|^2} A_i, \tag{1}$$

where i=k mod m+1, $b_i$ is the i-th component of the vector b, and $\lambda_k$ is a relaxation parameter. If the linear system is consistent, $x^k$ converges to the minimum-norm solution, provided that the iterations start with the zero vector.

In ART, the values of the pixels are considered as variables collected in vector x, and the image process is described by the matrix A. The measured angular projections are collected in vector b. Consequently, solving the tomography reconstruction for the target object is reduced to a system of linear equations Ax=b, which can be solved by the Kaczmarz's algorithm.

In this embodiment, it is assumed that the projections of the target object are well aligned. The method is presented in the framework of a Radon transform and solved by an iteration algorithm. A solution is presented for a 2D case and then this solution is extended to any system. Note that other transforms than the Radon transformed may be used.

The mathematical formalism used to solve this problem is now discussed. For a compactly supported continuous function h: $\mathbb{R}^2 \to \mathbb{R}$, a number of $h_i$'s copies exist and each copy $h_i$ has a corresponding surrounding (i.e., background) $g_i$. The copy $h_i$ and its corresponding background $g_i$ can be clearly separated in the space $\mathbb{R}^2$, i.e.

$$h_i, g_i : \mathbb{R}^2 \to \mathbb{R}; i=1, \ldots, N$$

$$\text{supp}(h_i) \cap \text{supp}(g_i) = \emptyset; i=1, \quad (2)$$

where supp($f$) denotes the set-theoretic support of $f$. Note that FIG. 1 illustrates N copies $h_i$ and corresponding backgrounds $g_i$, in the time-space domain. Given the stained function $\{f_i \stackrel{\text{def}}{=} h_i + g_i\}$, the corresponding measured projection $p_i$ (shown in FIG. 1 in the Radon space) can be described as follows:

$$p_i(\theta_{ij}, s) = Rf_i(\theta_{ij}, s); i=1, \ldots, N, \theta_{ij} \in \Theta_i, j \leq M_i, \quad (3)$$

where $Rf$ presents the Radon transform of function $f$, $\theta_{ij}$ is the j-th projection angle for $f_i$, and $\Theta_i$ is the limited angular range of a given projection. The aim of the novel CRM workflow in this embodiment is to estimate h from the measured projection $p_i(\theta_{ij}, s)$.

For h, the conventional solution (see again FIG. 1) is to first solve in step 110 the inverse Radon transform $R_{inv}(p_i)$ for each stained function $f_i$, and then to average in step 120 the $h_i$ to gain an estimate $\hat{h}$, i.e.

$$\hat{h} = \frac{1}{N} \sum_{i=1}^{N} (1_{\text{supp}(f)} R_{inv}(p_i)), \quad (4)$$

where $\otimes$ represents the Hadamard product.

For a discrete condition, the Radon transform can be reduced to a linear system. In this embodiment, the problem for h is solved by conventional ART. FIG. 1 shows, in addition to the averaging workflow 130, the constrained reconstruction workflow 140. The computational model of these two workflows is now discussed in more detail.

For the i-th observation, the workflow collects the measured angular projections $p_i(\theta_{ij}, s)$, $j=1, \ldots, M_i$ in a vector $b_i$. Note that the angular projections $p_i(\theta_{ij}, s)$ are acquired with any of the imagining devices discussed above. Then, the workflow defines the vector $f_i$ as $f_i = [h_i^T, g_i^T]^T$ and the matrix $A_i$ as $A_i = [D_i, B_i]$, where vector $h_i$ represents the pixels covered by function $f_i$, vector $g_i$ represents the pixels covered by function $g_i$, matrix $D_i$ represents the projection coefficients that operate on $h_i$ and matrix $B_i$ represents the projection coefficients that operate on $g_i$. The inverse problem for the i-th observation is to solve $A_i f_i = b_i$.

The general averaging workflow 130 (see FIG. 1) solves the following linear equations:

$$\begin{cases} D_1 h_1 + B_1 g_1 = b_1 \\ \vdots \\ D_N h_N + B_N g_N = b_N \\ h = \frac{1}{N} \sum_{i=1}^{N} h_i \end{cases} \quad (5)$$

where vector h is the final discrete estimation for function h. Equation (5) is a linear system exactly reduced from equation (4). It is easy to first solve each observation separately in step 110 and then combine the results by averaging in step 120.

Different from the averaging approach 130, the constrained reconstruction approach 140 introduces the condition that $h_1 = h_2 \ldots = h_N = h$ (all the observations are equal with each other). With this condition, the constrained reconstruction solution becomes:

$$\begin{cases} D_1 h + B_1 g_1 = b_1 \\ \vdots \\ D_N h + B_N g_N = b_N \end{cases} \quad (6)$$

Here, the estimation $\{h_i\}$ is directly replaced by h. Therefore, the reconstruction in step 150 is based on all the projections at the same time.

To demonstrate that the constrained reconstruction workflow 140 has a solution space that is not larger than the solution space of the averaging workflow 130, the following Lemma is considered.

Assuming the linear system in both equations (5) and (6) are simplified, equation (5) can be rewritten as:

$$\begin{bmatrix} D_1 & B_1 & \ldots & 0 & 0 & \ldots & 0 & 0 & 0 \\ \vdots & \vdots & \ddots & \vdots & \vdots & & \vdots & \vdots & \vdots \\ 0 & 0 & \ldots & D_i & B_i & \ldots & 0 & 0 & 0 \\ \vdots & \vdots & & \vdots & \vdots & \ddots & \vdots & \vdots & \vdots \\ 0 & 0 & \ldots & 0 & 0 & \ldots & D_N & B_N & 0 \\ I & 0 & \ldots & I & 0 & \ldots & I & 0 & -NI \end{bmatrix} \begin{bmatrix} h_1 \\ g_1 \\ \vdots \\ h_i \\ g_i \\ \vdots \\ h_N \\ g_N \\ h \end{bmatrix} = \begin{bmatrix} b_1 \\ \vdots \\ b_i \\ \vdots \\ b_n \\ 0 \end{bmatrix} \quad (7)$$

and equation (6) can be rewritten as:

$$\begin{bmatrix} B_1 & \ldots & 0 & \ldots & 0 & D_1 \\ \vdots & \ddots & \vdots & & \vdots & \vdots \\ 0 & \ldots & B_i & \ldots & 0 & D_1 \\ \vdots & & \vdots & \ddots & \vdots & \vdots \\ 0 & \ldots & 0 & \ldots & B_n & D_1 \end{bmatrix} \begin{bmatrix} g_1 \\ \vdots \\ g_i \\ \vdots \\ g_n \\ h \end{bmatrix} = \begin{bmatrix} b_1 \\ \vdots \\ b_i \\ \vdots \\ b_n \end{bmatrix}. \quad (8)$$

Here, the left parameter matrix of equation (7) is denoted as $A_{avg}$ and the parameter matrix of equation (8) is denoted as $A_{con}$. For an underdetermined m×n linear system Ax=b, the degree of freedom depends on the number of free variables or the span of the left-hand matrix, i.e., dim(A)=n−rank(A), where dim(A) represents the dimension of the solution space. Denoting the attribute number in $g_i$, $h_i$ and h as $n_{gi}$, $n_{hi}$ and $n_h$, respectively, where $n_h = n_{hi}$, i=1, . . . , N, the dimension of the solution space for the averaging workflow and constrained reconstruction is as given by:

$$\dim(A_{avg}) = n_h + \Sigma_{i=1}^{N}(n_{gi} + n_{hi}) - \text{rank}(A_{avg}) \quad (9)$$

and $$\dim(A_{con}) = n_h + \Sigma_{i=1}^{N} n_{gi} - \text{rank}(A_{con}). \quad (10)$$

Considering that $\text{rank}(A_{avg}) = \Sigma_{i=1}^{N} \text{rank}[D_i, B_i] + n_h$ and $n(h) = n(h_i)$, i=1, . . . , N, the dimension of the solution space for the averaging workflow can be simplified to be:

$$\dim(A_{avg}) = N \cdot n_h + \Sigma_{i=1}^{N} n_{gi} - \Sigma_{i=1}^{N} \text{rank}([D_i, B_i]). \quad (11)$$

Considering the rank $$\left( \begin{bmatrix} A & C \\ 0 & B \end{bmatrix} \right) \geq \text{rank}(A) + \text{rank}(B),$$

by iteratively applying the inequation to $A_{con}$, the following relation is obtained: $\text{rank}(A_{con}) \geq \sum_{i=1}^{N} \text{rank}(B_i) + \text{rank}([B_N, D_N])$. Therefore, $$\dim(A_{con}) \leq n_h + \sum_{i=1}^{N} n_{g_i} - \sum_{i=1}^{N-1} \text{rank}(B_i) - \text{rank}([D_n, B_n]). \quad (12)$$

By subtracting equation (12) from equation (11), the following is obtained:

$$\dim(A_{avg}) - \dim(A_{con}) \geq (N-1) \cdot n_h + \sum_{i=1}^{N-1} (\text{rank}(B_i) - \text{rank}([D_i, B_i])). \quad (13)$$

Rewriting inequation (13) and considering $n_h = n_{h_i} \geq \text{rank}(D_i)$, the following is obtained:

$$\dim(A_{avg}) - \dim(A_{con}) \geq \sum_{i=1}^{N-1}(n_{h_i} - \text{rank}(D_i)) + \sum_{i=1}^{N-1}(\text{rank}(D_i) + \text{rank}(B_i) - \text{rank}([D_i, B_i])) \geq 0. \quad (14)$$

Equation (14) shows that the solution space of the constrained reconstruction is not larger than solution space of the averaging workflow.

It is noted that the main difference between $\dim(A_{avg})$ and $\dim(A_{con})$ comes from the term $n_{h_i} - \text{rank}(D_i)$. For a real-world dataset, the range of tilt angle is limited and the sampling is discrete, which makes $n_{h_i} \gg \text{rank}(D_i)$, which results in missing the wedge effort. Therefore, in practice, $\dim(A_{con})$ for the CRM workflow should be much smaller than $\dim(A_{avg})$ for the averaging workflow, which leads to a better estimation of the target object.

A solution for the constrained reconstruction method 140 is now discussed. Considering an L2-norm minimized solution, the optimization of equation (6) is to find such $h_i$ and $g_i$ to minimize the total deviation. Therefore, the objective function can be written as:

$$\min_{h_i, g_i} \sum_{i=1}^{N} \|D_i h_i + B_i g_i - b_i\|_2^2, \quad (15)$$
$$\text{s.t. } h_i = h_{i+1}; i = 1, \ldots, N-1$$

where matrix $A_{con}$ is decomposed by the projection of observations.

Even though this embodiment is limited in iteration solutions, there are a number of methods to solve equation (6), for example, Least Square Estimation (LSE) and Kaczmarz algorithm. Because LSE needs to solve the inversion of the whole matrix in equation (6), these solutions require a large amount of computational resources when a large number of observations exist. The Kaczmarz algorithm is an iterative algorithm for solving linear equation systems and is applicable to any linear system. Therefore, it is also feasible for equation (6) with small modifications. However, a direct implementation of the Kaczmarz algorithm still faces the problem of a large parameter matrix and limited memory.

Therefore, in the following, a sparse Kaczmarz algorithm for the constrained reconstruction method is introduced. Considering the linear system of equation (8), let $$A_{con} = \begin{bmatrix} A_1 \\ A_2 \\ \vdots \\ A_n \end{bmatrix}, \bar{b} = \begin{bmatrix} B_1 \\ B_2 \\ \vdots \\ B_n \end{bmatrix} \quad (16)$$

and $$D_i = \begin{bmatrix} D_{i,1} \\ \vdots \\ D_{i,m} \end{bmatrix}, B_i = \begin{bmatrix} B_{i,1} \\ \vdots \\ B_{i,m} \end{bmatrix}, b_i = \begin{bmatrix} b_{i,1} \\ \vdots \\ b_{i,m} \end{bmatrix}, \quad (17)$$

where $A_i$ is the i-th component of the $A_{con}$, $b_i$ is the i-th component of the $\bar{b}$, $D_{i,j}$ is the j-th row of $D_i$, $B_{i,j}$ is the j-th row of $B_i$ and $b_{i,j}$ is the j-th row of $b_i$. The method iteratively solves the linear problem with the Karczmarz algorithm. According to the independence of the projections for each observation, the estimation is decomposed into several groups. For each group there are m+1 estimations, where m represents the number of coefficients in the projections for each observation (in practice, the number of projections for each observation can be different):

Group 1: $f^{(1,1)}, f^{(1,2)}, \ldots, f^{(1, m \cdot N)}$
Group 2: $f^{(2,1)}, f^{(2,2)}, \ldots, f^{(2, m \cdot N)}$
$\ldots$
Group p: $f^{(p,1)}, f^{(p,2)}, \ldots, f^{(p, m \cdot N)}$
$\ldots$ where $f^{p,q}$ is the q-th solution for p-th group.

Starting from a random solution, the solutions $f^{(i,j)}$ can be updated as following:

$$f^{(i,j)} = \begin{cases} f^{(i,j-1)} + \dfrac{b_j - A_j f^{(i,j-1)}}{\|A_j\|^2} A_j^T, & j = 2, 3, \ldots, m \cdot N \\ f^{(i-1, m \cdot N)} + \dfrac{b_j - A_j f^{(i-1, m \cdot N)}}{\|A_j\|^2} A_j^T, & j = 1 \end{cases} \quad (18)$$

Due to the sparsity of matrix A, equation (18) can be further simplified. Given $j = mp + q (p \geq 0, q \geq 0)$ and $A_j = [D_{p+1,q}, 0_{m \times n2p}, B_{p+1,q}, 0_{m \times (n2(N-1-p))}]$, by substituting $A_j$ into equation (18), the following equation is obtained:

$$\begin{bmatrix} h^{(i,j)} \\ g_{p+1}^{(i,j)} \end{bmatrix} = \begin{cases} \begin{bmatrix} h^{(i,j-1)} \\ g_{p+1}^{(i,j-1)} \end{bmatrix} + \dfrac{b_{p+1,q} - [D_{p+1,q}, B_{p+1,q}] \begin{bmatrix} h^{(i,j-1)} \\ g_{p+1}^{(i,j-1)} \end{bmatrix}}{\|D_{p+1,q}, B_{p+1,q}\|^2} [D_{p+1,q}, B_{p+1,q}]^T, & j = 2, 3, \ldots, m \cdot N \\ \begin{bmatrix} h^{(i-1, m \cdot N)} \\ g_{p+1}^{(i-1, m \cdot N)} \end{bmatrix} + \dfrac{b_j - A_j \begin{bmatrix} h^{(i-1, m \cdot N)} \\ g_{p+1}^{(i-1, m \cdot N)} \end{bmatrix}}{\|A_j\|^2} A_j^T, & j = 1 \end{cases} \quad (19)$$

which is equal to calculating $D_i h + B_i g_i = b_i$ and then transporting the calculated $\hat{h}_i$ to $D_{(i+1)} h + B_{(i+1)} g_{(i+1)} = b_{(i+1)}$ for all the $i = 1, 2, \ldots N$, until the computation has converged or the maximal iteration number has been reached.

The algorithm shown in FIG. 2 illustrates the pseudo-code for the sparse Kaczmarz algorithm for the constrained reconstruction method. It should be noted that the above derivation did not introduce any additional variables or assumptions, which is different from the current algorithms. Therefore, the sparse Kaczmarz algorithm performs similar to the original Kaczmarz algorithm with regard to results and convergence.

A general workflow for the constrained reconstruction method is now discussed. The object reconstruction from various observations can be expressed in another way. Given the set of measured data $P=\{p_i(\theta_{ij},s)\}$ from equation (3), for each measured data, a stained observation $f_i$ exists, all of which make up a set of unobserved latent data $G=\{g_i\}$ and the unknown parameters h (defined by equation (3)). For the observations of a random copy of the target object, given that h contains the missed information, it is possible to estimate the $G=\{g_i\}$ by maximizing the likelihood between $R(g_i,h)(\theta_{ij},s)$ and $pi(\theta_{ij},s)$ more accurately (note that $\theta_{ij}$ is the projection angle). For each observation, the information gain will accumulate during the loop and result in less artifacts.

Though the sparse Kaczmarz algorithm demonstrates a possible implementation with low memory and computational costs, it is further possible to generalize the sparse Kaczmarz algorithm to a general workflow for the constrained reconstruction, in which either iterative methods, e.g., SART, SIRT can be carried out.

It can be proven that the objective function of the constrained reconstruction method can be solved by simultaneous algebraic reconstruction technique with sparse decomposition. This means that the iteration for a system composed by two observations can be decomposed into two steps, i.e., $$\begin{bmatrix} h^{(k,1)} \\ g_1^{(k+1)} \end{bmatrix} = \begin{bmatrix} h^{(k)} \\ g_1^{(k)} \end{bmatrix} + w \begin{bmatrix} V_D^{-1} & \\ & V_{B_1}^{-1} \end{bmatrix} \begin{bmatrix} D^{(T)} \\ B_1^{(T)} \end{bmatrix} W_1^{-1} \left( b_1 - [D_1 B_1] \begin{bmatrix} h^k \\ g_1^k \end{bmatrix} \right) \quad (20)$$

and $$\begin{bmatrix} h^{(k+1)} \\ g_2^{(k+1)} \end{bmatrix} = \begin{bmatrix} h^{k,1} \\ g_2^k \end{bmatrix} + w \begin{bmatrix} V_D^{-1} & \\ & V_{B_2}^{-1} \end{bmatrix} \begin{bmatrix} D_2^T \\ B_2^T \end{bmatrix} W_2^{-1} \left( b_2 - [D_2 B_2] \begin{bmatrix} h^{k,1} \\ g_2^k \end{bmatrix} \right). \quad (21)$$

It is then possible to generalize the derivation for a system with N observations, i.e., $$\begin{bmatrix} D_1 & B_1 & & \\ D_2 & 0 & B_1 & \\ & & \ldots & \\ D_N & 0 & & B_N \end{bmatrix} \begin{bmatrix} h \\ g_1 \\ \vdots \\ g_N \end{bmatrix} = \begin{bmatrix} b_1 \\ b_2 \\ \vdots \\ b_N \end{bmatrix}. \quad (22)$$

For the general case, a similar solution as for the solution with N=2, is obtained by solving $[D_1, B_1]$, $[D_2, B_2]$, ..., $[D_N, B_N]$ iteratively.

The applicability of the sparse decomposition for SIRT or other iterative reconstruction algorithms can be derived similarly as above.

Figure 3:
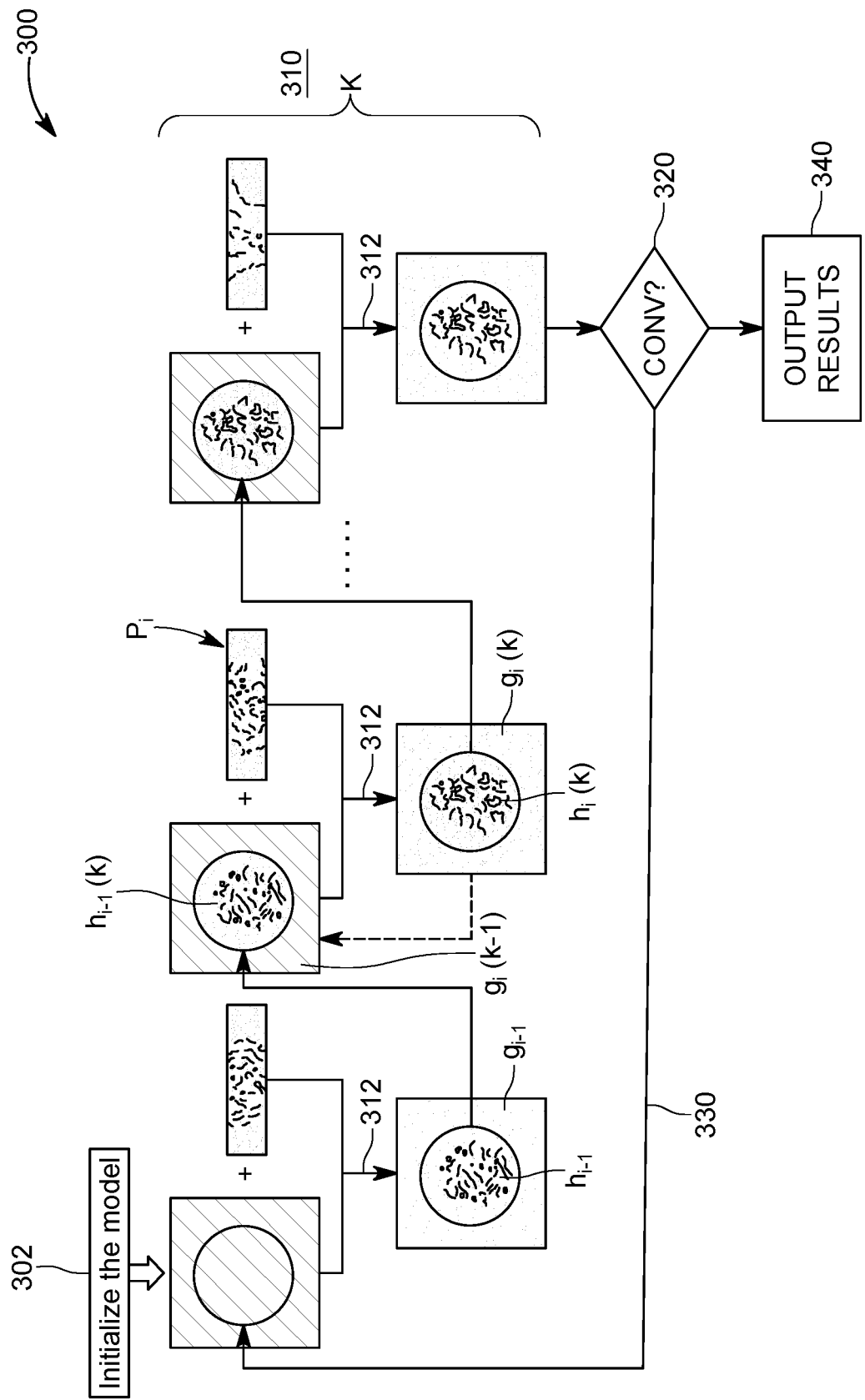
FIG. 3 schematically illustrates how an image of a target object is reconstructed from a projection, an image of the target object from a previous index and a background from a previous iteration.
Figure 4:
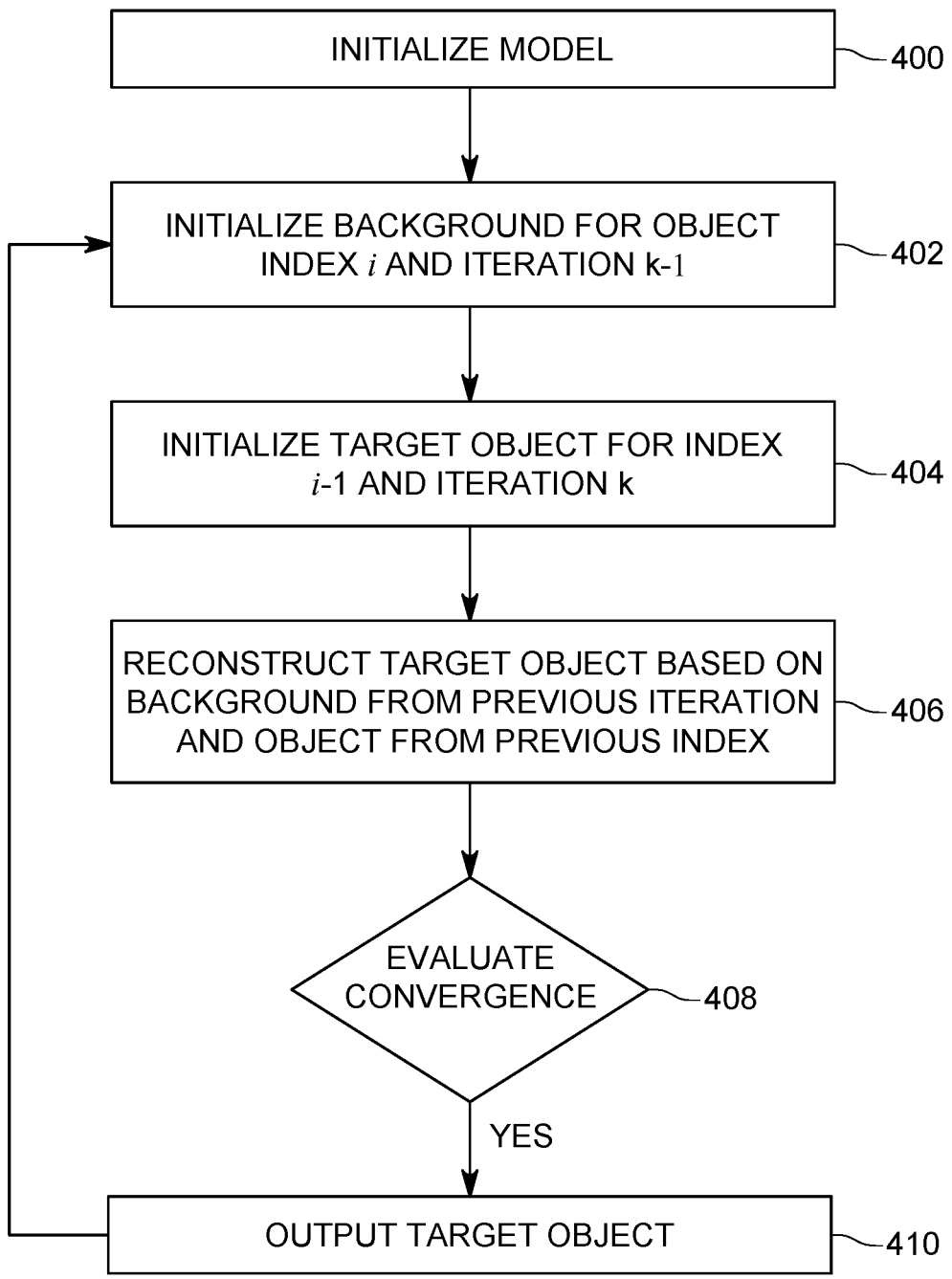
FIG. 4 is a flowchart of a method that uses a constrained reconstruction workflow to reconstruct an image.

FIG. 3 schematically illustrates the generalized constrained reconstruction workflow 300 and FIG. 4 is a flowchart of a method for implementing the constrained reconstruction workflow. The method starts in step 400 in which the model is initialized, which corresponds to block 302 in FIG. 3. Among various operations that might take place in step 400, the observed/measured data is transformed from the time-space domain to the Radon domain. Note that the method may be adapted for other transformations. In addition, it is possible in the initialization step to let the iteration number k=0 and the object index i=0. Note that each iteration k is illustrated by block 310 in FIG. 3, and each iteration k includes "i" observations $p_i$, where "i" varies from one to N.

Assume that the method has previously performed k−1 iterations and thus, during the k iteration, there are already values that correspond to the background $g_i$ for the k−1 iteration, and also for the target object $h_i$ for the k−1 iteration. In addition, for each index i, there is an observation $p_i$.

Considering the i-th observations for the k-th iteration, the background $g_i(k)$ is initialized in step 402 by the value of the previous iteration's result for the same index, i.e., $g_i(k)=g_i(k-1)$ (where i is the current index and k is the previous iteration). The target object is initialized in step 404 by the (i−1)-th's result, i.e., $h_i(k)=h_{i-1}(k)$. In other words, the background is taken from the previous iteration k−1 with the same index i, while the target object is taken from the same iteration k, but the previous index i−1. For these reasons, the reconstruction method is called a constrained reconstruction method, as the background and the object are constrained by the previous iteration and the previous index, respectively.

These values are then used together with the i observation $p_i$ for the target object in step 406 for iteratively reconstructing (see step 312 in FIG. 3), based on equation (22), the background $g_i(k)$ and object $h_i(k)$ as illustrated in FIG. 3. This process is repeated for all N values of the i index, for each iteration k (310). When the index i is N, the target object is evaluated whether its mathematical representation has converged to a desired value in step 408 (which corresponds to block 320 in FIG. 3). For example, an expected value may be selected and step 408 compares the calculated reconstruction to the expected value, and if the difference is smaller than a set threshold, a decision is made that the calculated reconstruction is good enough. If the result has not converged, then the method returns to step 402 for performing another iteration k+1 (step 330 in FIG. 3). However, if the result has converged, the method displays in step 410 (block 340 in FIG. 3) the image of the target object. Note that the image is displayed in the time-space domain, i.e., a reverse Radon transform has been applied during the reconstruction step 312.

Figure 5:
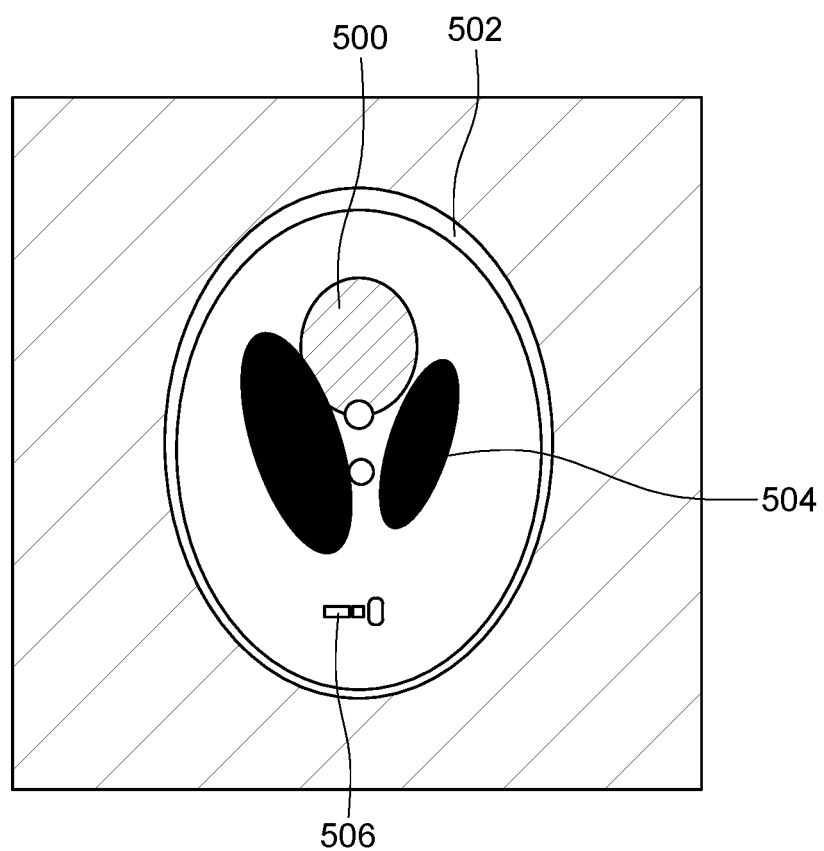
FIG. 5 illustrates a Shepp and Logan head phantom.

The performance of the method illustrated in FIG. 4 has been assessed by computer simulation with the high-contrast Shepp and Logan head phantom shown in FIG. 5. This image has a 320×320 pixel size. Without the loss of generalization, all the experiments are carried as 2D computed tomography. Here, for the convenience of the discussion and without the loss of generality, only the target object 500 is discussed, which is protected by a large enough mask 502.

The simulations carried out by the inventors show that the obtained image of the target object is stained by the surroundings around the interested object, including black blocks 504 and noises 506. These stained copies will serve as the ground-truth of the experiment. In practice, for each copy of the target object, only a limited amount of information (range limited projections) can be observed. A series of random angles were generated and the copies were projected according to the tilt angle, resulting in a series of Radon transform (projection). If necessary, additional noise will be added into the projections for further discussion.

Figure 6A:
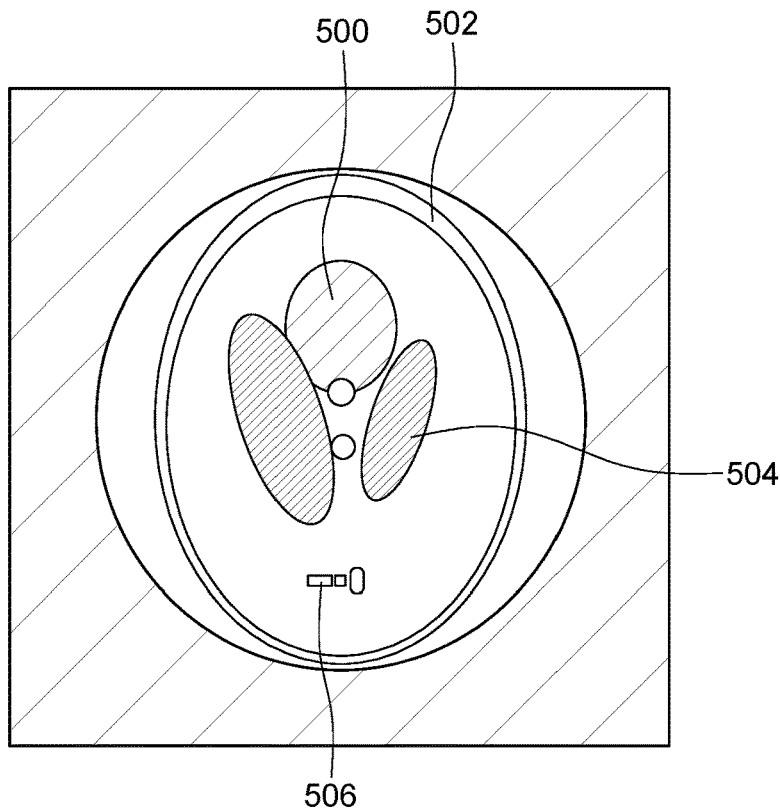
FIG. 6A illustrates a reconstructed Shepp and Logan head phantom using the averaging workflow and FIG. 6B illustrates the reconstructed Shepp and Logan head phantom using the constrained reconstruction workflow.
Figure 6B:
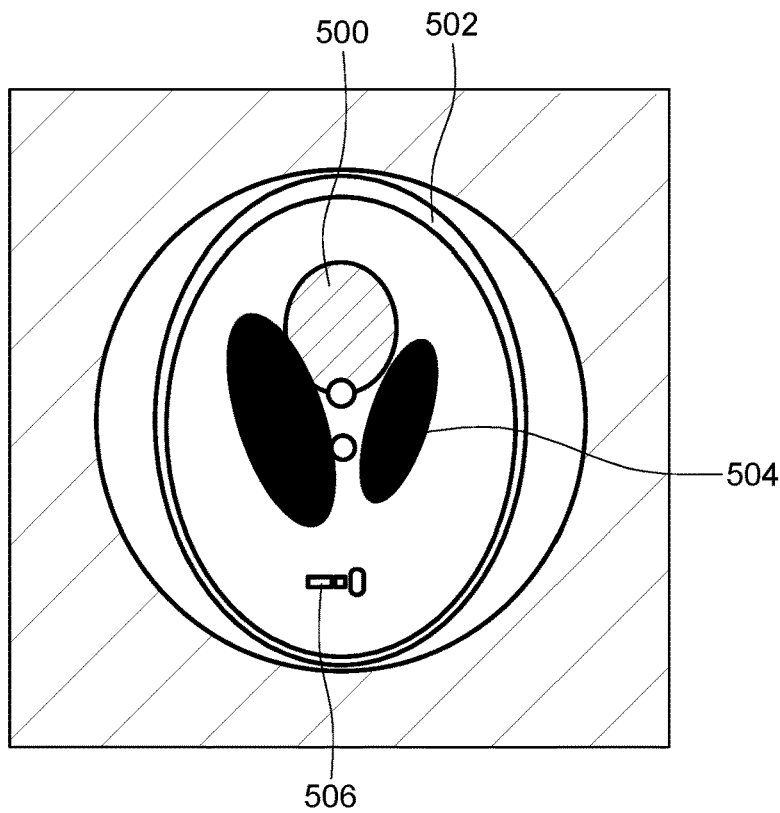

FIGS. 6A and 6B demonstrate the visual improvement of the constrained reconstruction method. For these figures, the constrained reconstruction system includes only 3 copies of the interested object. For each image of the copy, the surrounding space around the interested object was stained. During the simulation, the Shepp and Logan phantom was stained with blocks. ±50° title angles with 3° interval are used to generate the projections (range-limited) for each observation. FIG. 6A show the image obtained with the average approach, which reconstructs the observations directly and then gains the interested object by averaging while FIG. 6B show the image obtained with the novel constrained reconstruction method, which reconstructs the observations by using the background from a prior iteration and using the target object corresponding to a previous index as discussed above with regard to FIG. 4.

FIGS. 6A and 6B illustrate the images obtained by the averaging workflow and the constrained reconstruction workflow on the Shepp and Logan phantom, where all the data are reconstructed by SART's update strategy, with 20 iterations and 0.2 relaxation. For FIG. 6A, although the averaging workflow can alleviate the effect of the missing wedge, the details of the Shepp and Logan phantom still have been weakened. FIG. 6B demonstrates the improvements achieved by the constrained reconstruction workflow. The workflow starts with the 1st observation. After applying one iteration with the SART reconstruction algorithm, the workflow moves to optimize the 2nd observation with the previous optimization from the 1st observation. The process continues with the 3rd observation and goes back to 1st observation, repeating until reaching the maximal iterations. With such strategy, the constrained reconstruction workflow used all the information from the different copies of the target object in each turn's iteration. By comparing the details of FIG. 6B and those of FIG. 6A, it can be found that for each stained copy, the constrained reconstruction workflow generates a better estimation of the stained surrounding.

The averaging workflow and the constrained reconstruction workflow have also been compared when applied to the ribosome from EMDB 3489 (with SART algorithm using 20 iterations with 0.2 relaxation). Different from the block stains used in Shepp and Logan phantom comparison, random noise with similar signal strength as the object was used. It was found that the constrained reconstruction workflow contains less artifacts and produced a better reconstruction of the stained background again. Furthermore, the results of the averaging workflow for the target object looks very blurry, while the result produced by the constrained reconstruction workflow shows much more details.

The capabilities of the averaging and constrained reconstruction workflow were further analyzed in the Fourier space. Though good-shape results were produced by the averaging workflow, their FT maps still contain the trace of the missing wedging. On the contrary, the Fourier space has been filled well by the results produced by the constrained reconstruction workflow.

The comparisons discussed above shown qualitative differences between the two workflows. A quantitative analysis has also been performed for these two workflows as now discussed. The Pearson's inner-product correlation coefficient (PCC), Structural SiMilarity (SSIM) and Peak signal-to-noise ratio (PSNR) were used to estimate the similarity between the reconstruction output and the ground-truth image.

For this analysis, the reconstruction results were measured by the PSNR, SSIM and PCC methods. FIG. 7 illustrates the measured value for the two sets of data noted above, where the best performance is highlighted in bold (AVG indicates the averaging workflow and CRM indicates the constrained reconstruction workflow). According to the table shown in this figure, it can be observed that the constrained reconstruction workflow always outperforms the averaging workflow.

Figure 8:
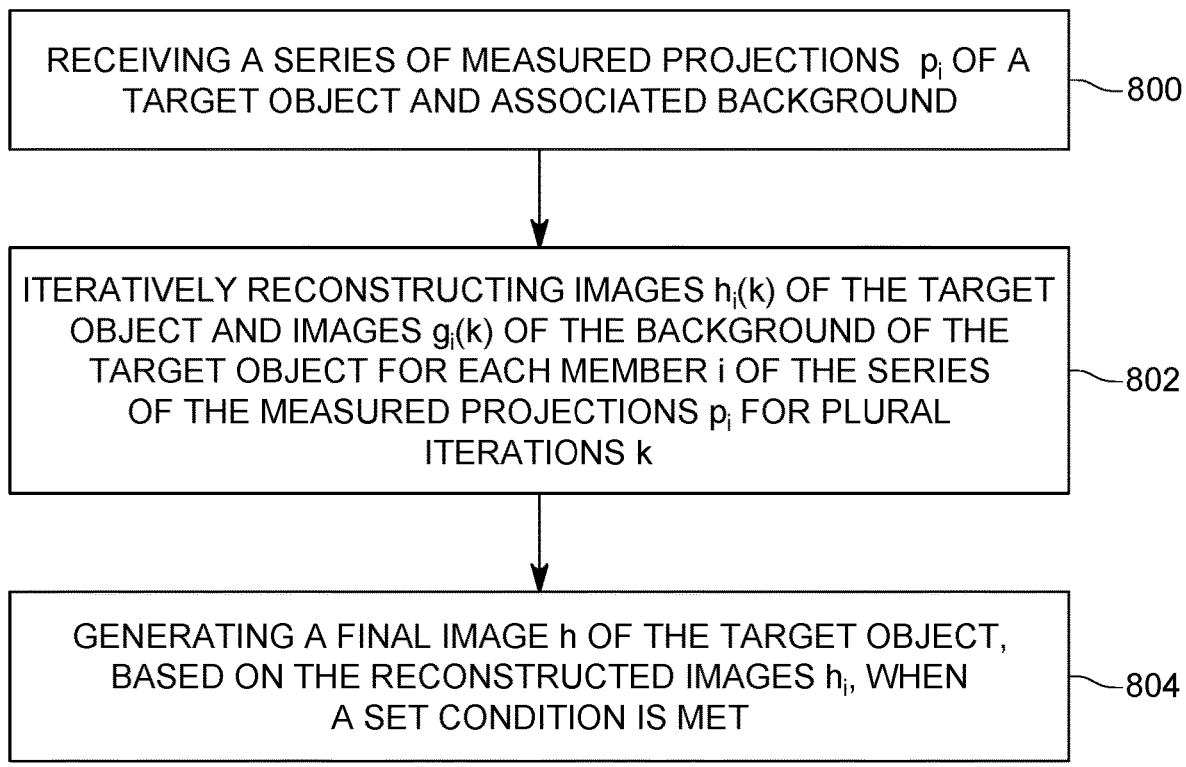
FIG. 8 is a flowchart of a method for applying a constrained reconstruction workflow for reconstructing an image of a target object from plural projections.

A method for image reconstruction from plural copies is now discussed with regard to FIG. 8. The method includes a step 800 of receiving a series of measured projections $p_i$ of a target object and associated background, a step 802 of iteratively reconstructing images $h_i(k)$ of the target object and images $g_i(k)$ of the background of the target object for each member i of the series of the measured projections $p_i$ for plural iterations k, and a step 804 of generating a final image h of the target object, based on the reconstructed images $h_i$, when a set condition is met, where index i describes how many elements are in the series of projections $p_i$, and iteration k indicates how many times the reconstruction of the image target is performed. The set condition may be an upper limit for the iteration k.

The method may also include one or more of the steps of, for a given iteration k, and for a given index i, initiating the image $g_i(k)$ of the background from an image go (k) of the background corresponding to a previous index i−1, and/or for the given iteration k, and for the given index i, initiating the image $h_i$ of the target object from an image $h_i(k-1)$ of a previous iteration k−1, calculating the image $h_i(k)$ of the target object and the image $g_i(k)$ of the background of the target object based on (i) the image $h_i(k-1)$ of the target object from the previous iteration k−1, (ii) the image $g_{i-1}(k)$ of the background from the previous index i−1, and a corresponding measured projection $p_i$, and/or solving an equation the image of the target object, the image of the background, the measured projections, and a matrix that describes image processing, and/or applying a Kaczmarz algorithm to solve the equation for each index i and for each iteration k. In one application, the series of measured projections $p_i$ are in the Radon space.

Figure 9:
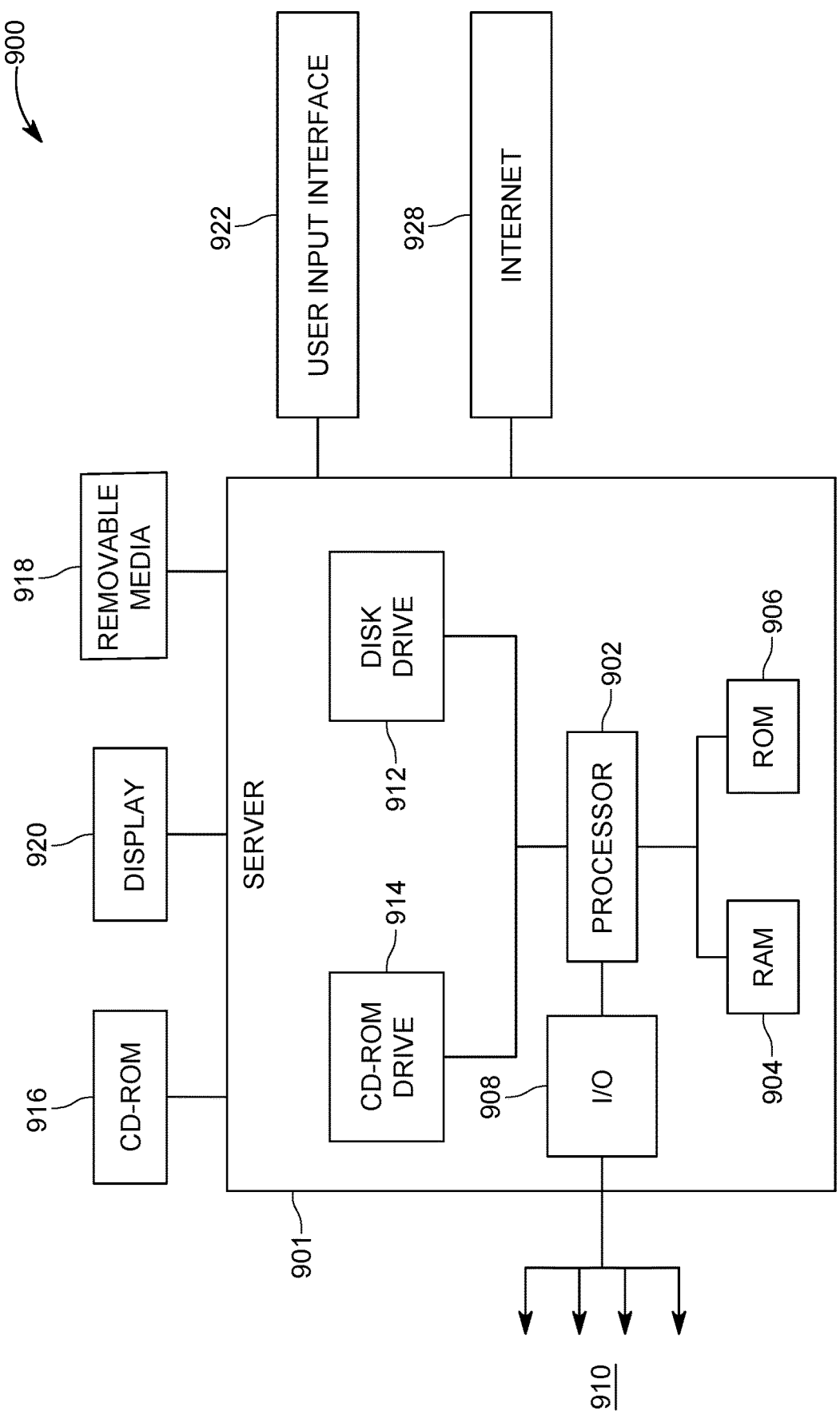
FIG. 9 is a schematic diagram of a computing device that implements the novel methods discussed herein.

The above-discussed procedures and methods may be implemented in a computing device or controller as illustrated in FIG. 9. Hardware, firmware, software or a combination thereof may be used to perform the various steps and operations described herein. Computing device 900 of FIG. 9 is an exemplary computing structure that may be used in connection with such a system.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as a smart device, e.g., a phone, tv set, computer, etc. The server may be part of a larger network configuration as in a global area network (GAN) such as the Internet 928, which allows ultimate connection to various landline and/or mobile computing devices.

The disclosed embodiments provide methods for reconstructing a target object's image from plural projections that have limited range and are stained. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Carazo, J. M. (1992). The fidelity of 3d reconstructions from incomplete data and the use of restoration methods. In Electron tomography, pages 117-164.

Carazo, J. M. and Carrascosa, J. L. (1987). Information recovery in missing angular data cases: an approach by the convex projections method in three dimensions. Journal of Microscopy, 145(1), 23-43.

Chen, Y. and Forster, F. (2014). Iterative reconstruction of cryo-electron tomograms using nonuniform fast fourier transforms. Journal of Structural Biology, 185(3), 309-316.

Chen, Y., Zhang, Y., Zhang, K., Deng, Y., Wang, S., Zhang, F., and Sun, F. (2016). Firt: Filtered iterative reconstruction technique with information restoration. J. Struct. Biol., 195(1), 49-61.

Deng, Y., Chen, Y., Zhang, Y., Wang, S., Zhang, F., and Sun, F. (2016). Icon: 3d reconstruction with missing-information restoration in biological electron tomography. J. Struct. Biol., 195(1), 100-112.

Gordon, R., Bender, R., and Herman, G. T. (1970). Algebraic reconstruction techniques (art) for three-dimensional electron microscopy and x-ray photography. J. Theor. Biol., 29(3), 471-481.

Kovacik, L., Kerieche, S., Hoog, J. L., Juda, P., Matula, P., and Raska, I. (2014). A simple fourier filter for suppression of the missing wedge ray artefacts in single-axis electron tomographic reconstructions. Journal of Structural Biology, 186(1), 141-152.

What is claimed is:

1. A method for image reconstruction from plural copies, the method comprising:
   receiving a series of measured projections $p_i$ of a target object h and associated background;
   iteratively reconstructing images $h_i(k)$ of the target object and images $g_i(k)$ of the background of the target object for each member i of the series of the measured projections $p_i$ over plural iterations k; and
   generating a final image of the target object h, based on the reconstructed images $h_i$, when a set condition is met,
   wherein the index i describes how many elements are in the series of projections $p_i$, and iteration k indicates how many times the reconstruction of the image target is performed,
   wherein the image $h_i(k)$ of the target object and the image $g_i(k)$ of the background of the target object are calculated, for a current iteration k and a current index i, based on (1) an image $h_{i-1}(k)$ of the target object from a previous index i−1 and the current iteration k, (2) an image $g_i(k-1)$ of the background from a previous iteration k−1 and the current index i, and (iii) a corresponding measured projection $p_i$ for the current index i, and
   wherein the image $h_{i-1}(k)$ is distinct from the image $g_i(k-1)$.

2. The method of claim 1, further comprising:
   for the current iteration k, and for the current index i, initiating the image $g_i(k)$ of the background from the image $g_i(k-1)$ of the background corresponding to the previous iteration k−1.

3. The method of claim 2, further comprising:
   for the current iteration k, and for the current index i, initiating the image $h_i$ of the target object from the image $h_{i-1}(k)$ of the previous index i−1.

4. The method of claim 1, wherein the step of calculating comprises:
   solving an equation that links the image of the target object, the image of the background, the measured projections, and a matrix that describes image processing.

5. The method of claim 4, wherein the equation is given by:

$$\begin{cases} D_1 h + B_1 g_1 = b_1 \\ \quad \vdots \\ D_N h + B_N g_N = b_N \end{cases},$$

where h is the image of the target object, $b_i$ includes the measurement data, and $D_i$ and $B_i$ are matrices that act on images $h_i$ and $g_i$, respectively.

6. The method of claim 4, further comprising:
   applying a Kaczmarz algorithm to solve the equation for each index i and for each iteration k.

7. The method of claim 1, wherein the series of measured projections $p_i$ are in the Radon space.

8. A computing device for reconstructing an image from plural copies, the computing device comprising:
   an interface for receiving a series of measured projections $p_i$ of a target object h and associated background; and
   a processor connected to the interface and configured to,
   iteratively reconstruct images $h_i(k)$ of the target object h and images $g_i(k)$ of the background of the target object for each member i of the series of the measured projections $p_i$ for plural iterations k; and
   generate a final image of the target object h, based on the reconstructed images $h_i$, when a set condition is met, wherein the index i describes how many elements are in the series of projections $p_i$, and the iteration k indicates how many times the reconstruction of the image target is performed, wherein the image $h_i(k)$ of the target object and the image $g_i(k)$ of the background of the target object are calculated, for a current iteration k and a current index i, based on (1) an image $h_{i-1}(k)$ of the target object from a previous index i−1 and the current iteration k, (2) an image $g_i(k-1)$ of the background from a previous iteration k−1 and the current index i, and (iii) a corresponding measured projection $p_i$ for the current index i, and wherein the image $h_{i-1}(k)$ is distinct from the image $g_i(k-1)$.

9. The computing device of claim 8, wherein the processor is further configured to:

for the current iteration k, and for the current index i, initiate the image $g_i(k)$ of the background from the image $g_i(k-1)$ of the background corresponding to a previous iteration k−1.

10. The computing device of claim 9, wherein the processor is further configured to:

for the current iteration k, and for the current index i, initiate the image $h_i$ of the target object from the image $h_{i-1}(k)$ of a previous index i−1.

11. The computing device of claim 8, wherein the processor is further configured to:

solve an equation that links the image of the target object, the image of the background, the measured projections, and a matrix that describes image processing.

12. The computing device of claim 11, wherein the equation is given by:

$$\begin{cases} D_1 h + B_1 g_1 = b_1 \\ \vdots \\ D_N h + B_N g_N = b_N \end{cases},$$

where h is the image of the target object, $b_i$ includes the measurement data, and $D_i$ and $B_i$ are matrices that act on images $h_i$ and $g_i$, respectively.

13. The computing device of claim 11, wherein the processor is further configured to:

apply a Kaczmarz algorithm to solve the equation for each index i and for each iteration k.

14. The computing device of claim 8, wherein the series of measured projections $p_i$ are in the Radon space.

15. A non-transitory computer readable medium including computer executable instructions, wherein the instructions, when executed by a processor, implement instructions for image reconstruction from plural copies, the instructions comprising:

receiving a series of measured projections $p_i$ of a target object h and associated background;

iteratively reconstructing images $h_i(k)$ of the target object and images $g_i(k)$ of the background of the target object for each member i of the series of the measured projections $p_i$ for plural iterations k; and generating a final image of the target object h, based on the reconstructed images $h_i$, when a set condition is met, wherein the index i describes how many elements are in the series of projections $p_i$, and the iteration k indicates how many times the reconstruction of the image target is performed, wherein the image $h_i(k)$ of the target object and the image $g_i(k)$ of the background of the target object are calculated, for a current iteration k and a current index i, based on (1) an image $h_{i-1}(k)$ of the target object from a previous index i−1 and the current iteration k, (2) an image $g_i(k-1)$ of the background from a previous iteration k−1 and the current index i, and (iii) a corresponding measured projection $p_i$ for the current index i, and wherein the image $h_{i-1}(k)$ is distinct from the image $g_i(k-1)$.

16. The medium of claim 15, further comprising instructions for:

for the current iteration k, and for the current index i, initiating the image $g_i(k)$ of the background from the image $g_i(k-1)$ of the background corresponding to a previous iteration k−1; and for the current iteration k, and for the current index i, initiating the image $h_i$ of the target object from the image $h_{i-1}(k)$ of a previous index i−1.

17. The medium of claim 15, wherein the step of calculating comprises:

solving an equation that links the image of the target object, the image of the background, the measured projections, and a matrix that describes image processing.

* * * * *